(12) United States Patent
Hall

(10) Patent No.: US 7,694,359 B1
(45) Date of Patent: Apr. 13, 2010

(54) PULL-CHAIN SHOWER VALVE

(76) Inventor: Leaton Hall, 2001 Miccosukee Rd., Tallahassee, FL (US) 32308

( * ) Notice: Subject to any disclaimer, the term of this patent is extended or adjusted under 35 U.S.C. 154(b) by 1122 days.

(21) Appl. No.: 11/334,653

(22) Filed: Jan. 18, 2006

(51) Int. Cl.
A47K 3/00 (2006.01)

(52) U.S. Cl. ............... 4/615; 4/567; 251/230; 239/581.1

(58) Field of Classification Search ............. 4/615–617, 4/620, 567, 568, 570; 251/230, 294; 239/581.1, 239/581.2, 582.1, 538
See application file for complete search history.

(56) References Cited

U.S. PATENT DOCUMENTS

| | | | | |
|---|---|---|---|---|
| 1,095,295 A | * | 5/1914 | Stevens | 251/230 |
| 1,511,953 A | * | 10/1924 | Dwyer | 251/294 |
| 1,519,157 A | * | 12/1924 | Muller | 251/230 |
| 2,965,313 A | * | 12/1960 | Jay | 239/581.1 |
| 3,030,033 A | | 4/1962 | Rosenkranz | |
| 4,177,972 A | * | 12/1979 | Legris | 251/230 |
| 4,427,177 A | * | 1/1984 | Constantinescu et al. | 251/230 |
| 4,568,060 A | * | 2/1986 | Sud | 251/230 |
| 5,172,860 A | | 12/1992 | Yuch | |
| 6,059,200 A | | 5/2000 | Chou | |
| 6,264,121 B1 | | 7/2001 | McClary | |
| 6,474,621 B1 | * | 11/2002 | Vogel | 4/605 |

* cited by examiner

Primary Examiner—Khoa D Huynh
(74) Attorney, Agent, or Firm—Peter Loffler

(57) ABSTRACT

A pull-chain shower valve is interposed between a pipe stub and a shower head of a typical shower and allows a user to turn the water on and off at the shower head assembly without the need to use the main valve controls of the shower. The device uses a ball valve that articulates between an open position wherein water flows out of the shower head and a closed position wherein water does not flow out of the shower head. A standard pull-chain assembly is used to articulate the ball valve between its open position and its closed position. A pull-chain of the pull-chain assembly is pulled in order to advance the ball valve to its next position. Each sufficient pull of the pull-chain advances the ball valve exactly 90 degrees. If the pull-chain is not pulled sufficiently, the ball valve resets to its prior position. A reset mechanism is provided for the pull-chain.

6 Claims, 2 Drawing Sheets

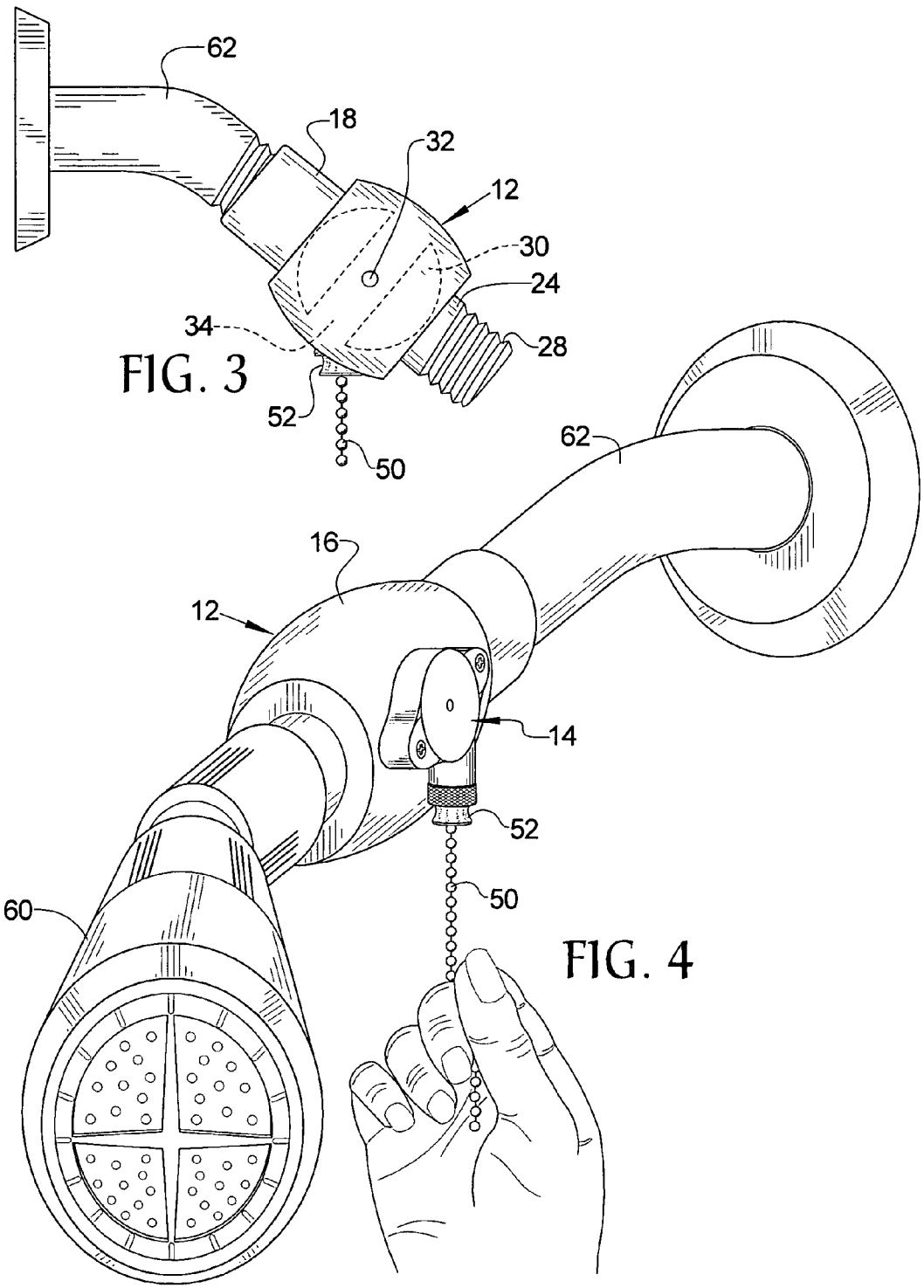

PULL-CHAIN SHOWER VALVE

BACKGROUND OF THE INVENTION

1. Field of the Invention

The present invention relates to a pull-chain based shower valve that allows turning of the shower water on and off without the need to reset the temperature control valves.

2. Background of the Prior Art

There are three distinct functional steps undertaken during a typical shower. After the temperature of the water is appropriately set to the desired temperature, a person enters the shower and gets underneath the water stream produced through the shower head so as to get wet. Once sufficiently wet, the person steps generally out of the water stream in order to lather up with soap in order to get clean. Once properly lathered and clean, the person steps back underneath the shower head in order to allow the water stream to rinse the soap off. This rather simple procedure is performed by millions of people on a daily basis but it has a drawback.

During the lathering and cleaning process, the person is substantially out of the water stream yet the water continues to run. As this middle step can take a fair of amount of time to complete, the water that continues to stream from the shower head during this time is wasted as is the energy required to heat the water (most people simply do not take cold showers). Although a person taking a shower can manually turn the water off during this step, most bathers do not so turn the water off due to the difficulty required to turn the water back on to the desired temperature that was achieved during the wetting stage. Most people simply allow the water to continue running with its attendant waste of water and energy.

To combat this problem, devices have been proposed wherein an on/off valve is provided that allows a person to relatively quickly turn the shower water off and thereafter to turn the shower water back on at the same temperature the water was at before the water was turned off. Such devices allow a person to temporarily discontinue the water stream during lathering and to resume the water stream fairly quickly and easily without loss of water temperature comfort. The problem with these prior art devices is that they are relatively complex and require a redesign of the entire shower head assembly, making such device relatively expensive to manufacture and purchase.

Accordingly, there exists a need in the art for a device that allows a person to turn the shower water stream on and off without the need to reset the temperature or pressure setting each time the water is turned back on, which device addresses the above mentioned problems found in the art. Specifically, such a device must be of relatively simple design and construction so as to not require a complete redesign of a shower head making the device is relatively inexpensive to manufacture and thus affordable to a large portion of the showering consumers. Ideally, such a device must be relatively easy to install and operate.

SUMMARY OF THE INVENTION

The pull-chain shower valve of the present invention addresses the aforementioned needs in the art. Specifically, the pull-chain shower valve is a device that allows a person to turn the shower water stream on and off without the need to reset the temperature or pressure setting each time the water is turned back on. The pull-chain shower valve is of relatively simple design and construction that does not require a complete redesign of a shower head, making the device relatively inexpensive to manufacture so as to be affordable to a large portion of the showering consumers. The pull-chain shower valve is relatively easy to install and operate.

The pull-chain shower valve of the present invention is comprised of a housing that has an inlet wherein water enters the housing and an outlet wherein water exits the housing. A valve is disposed within the housing and is capable of articulating between an open position wherein fluid flow communication exists between the inlet and the outlet and a closed position wherein fluid flow communication between the inlet and the outlet does not exist. A pull-chain assembly is attached to the housing and controls the articulation of the valve between the open position and the closed position. The pull-chain assembly is comprised of a clutch plate that is rotatably disposed within the pull-chain assembly and is attached to the valve. A ratchet plate is rotatably disposed within the pull-chain assembly and is keyed to the clutch plate so that rotation of the ratchet plate rotates the clutch plate and counterrotation of the ratchet plate does not rotate the clutch plate. A pull-chain is attached to the ratchet plate and rotates the ratchet plate upon pulling of the pull-chain. The valve is a ball valve. The inlet of the housing has female threading therein while the outlet of the housing has male threading thereon. A shower head is threadably attached to the outlet of the housing. A ratchet pawl is pivotally attached to the pull-chain assembly and is biased against the ratchet plate. A spring is attached to the pull-chain assembly and to the pull-chain for subsequent retraction the pull-chain upon advancement of the pull-chain.

BRIEF DESCRIPTION OF THE DRAWINGS

FIG. 3 is a left elevation view of the pull-chain shower valve installed within a shower.

FIG. 4 is a perspective view of the pull-chain shower valve in use within the shower.

Similar reference numerals refer to similar parts throughout the several views of the drawings.

DESCRIPTION OF THE PREFERRED EMBODIMENT

Figure 1:
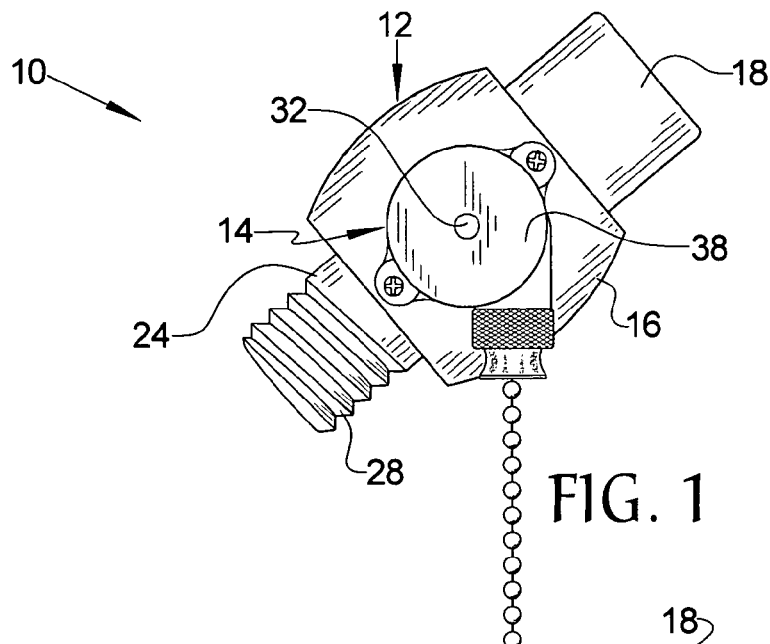
FIG. 1 is a right elevation view of the pull-chain shower valve of the present invention.
Figure 2:
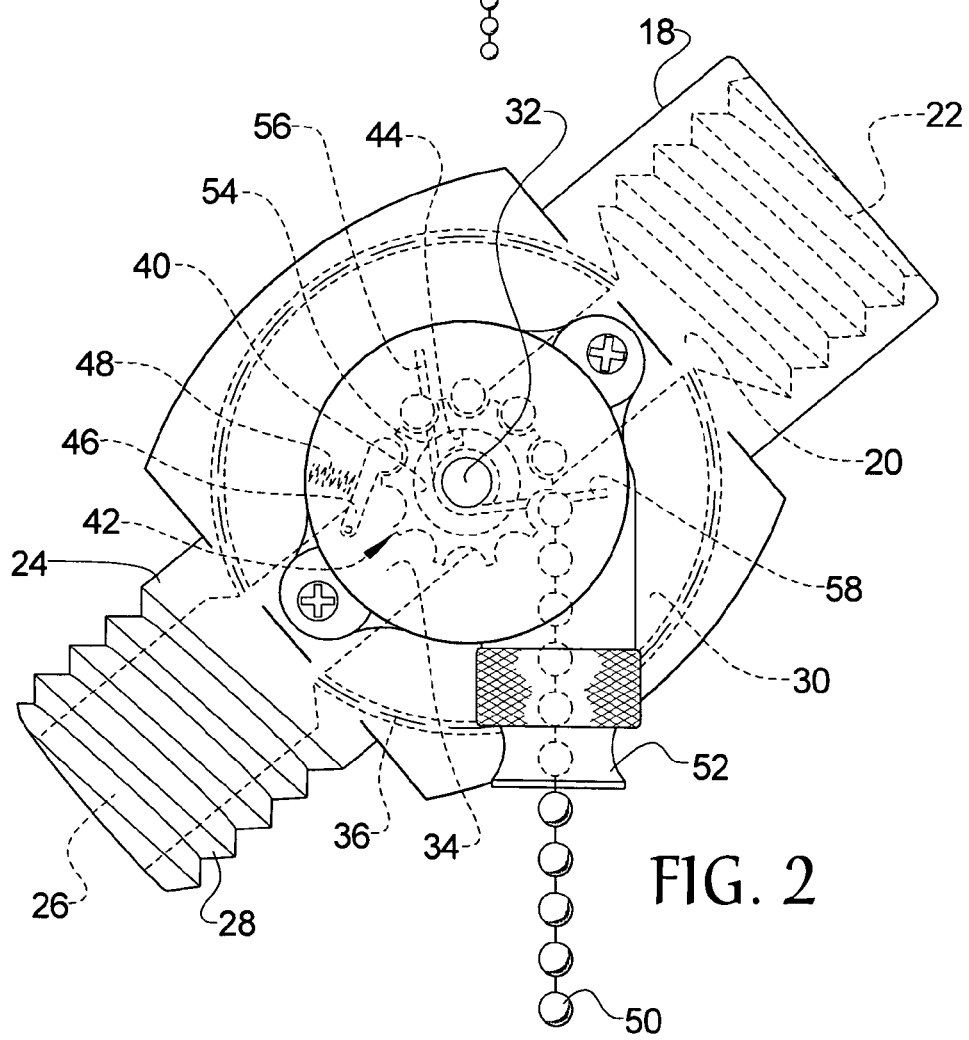
FIG. 2 is a right elevation detail view of the pull-chain shower valve and its internal components.

Referring now to the drawings, it is seen that the pull-chain shower valve of the present invention, generally denoted by reference numeral 10, is comprised of a ball-valve assembly 12 that has a pull-chain assembly 14 that controls the ball valve assembly 12. The ball valve assembly 12 has a housing 16 that has a first end 18 with a first internal passage 20 with female threads 22 therein and an opposing second end 24 with a second internal passage 26 with male threads 28 thereon. Located within the housing 16 is a ball valve 30 that is rotatably connected to the housing 16 by a pin 32, which ball valve 30 is positionable between a normally open position, as illustrated in FIG. 2, wherein its third internal passage 34 aligns with the first internal passage 20 of the first end 18 and the second internal passage 26 of the second end 24 in order to allow water to flow between the first internal passage 20 and the second internal passage 26 via the third internal passage 34, and a closed position, illustrated in FIG. 3, wherein the ball valve 30 is positioned so that its third internal passage 34 is offset 90 degrees from the first internal passage 20 and the second internal passage 26 in order to block fluid flow communication between the first internal passage 20 and the second internal passage 26. An appropriate sealing material 36 is provided about the outer periphery of the ball valve 30 in order to seal the ball valve 30.

Control of the ball valve 30 is achieved via the pull-chain assembly 14 which is a typical pull-chain control assembly and that has an outer plate 38 to which the pin 32 is also attached. A clutch plate 40 is disposed about the pin 32 for rotation thereabout. The clutch plate 40 is attached to the ball valve 30 such that rotation of the clutch plate 40 causes the ball valve 30 to rotate. A ratchet plate 42 is disposed about the pin 32. The ratchet plate 42 has a key 44 that is keyed to the clutch plate 40 so that rotation (in the illustration, clockwise rotation) of the ratchet plate 42 presses upon and keys on the clutch plate 40 and rotates the clutch plate 40 in lock-step, yet counterrotation of the ratchet plate 42 does not cause any movement of the clutch plate 40. A ratchet pawl 46 is pivotally attached to the outer plate 38 of the pull-chain assembly and engages the teeth of the ratchet plate 42 in order to prevent free wheeling of the ratchet plate 42. A spring 48 is disposed between the outer plate 38 and the ratchet pawl 46 in order to bias the ratchet pawl 46 against the ratchet plate 42. A pull-chain 50 has one end attached to the ratchet plate 42 and an opposing end that extends out through a neck 52 of the pull-chain assembly 14. A spring 54 has a first arm 56 that is attached to the outer plate 38 and a second arm 58 that attaches to the pull-chain 50, the spring partially wrapping about the pin 32. A series of evenly spaced teeth are disposed around the entire outer periphery of the ratchet plate such that a gap is located between each pair of adjacent teeth such that the ratchet pawl 46 is biased into the gap between an adjacent pair of teeth in order to prevent free wheeling of the ratchet plate 42 as schematically shown in FIG. 2.

In operation, the pull-chain shower valve 10 is positioned within a shower environment by first removing the existing shower head 60 that is attached to the pipe stub 62 and threadably securing the first end 18 of the device 10 to the pipe stub 62. Thereafter, the shower head 60 is threadably secured to the second end 24 of the device 10. A person uses the shower as desired. The pull-chain shower valve 10 allows the water stream to be controlled at the shower head 60 assembly. If the ball valve 30 is in the open position, the person showers as usual. If the person desires to temporarily cut off the water stream without using the main shower controls, such as during lathering, the person simply pulls on the pull-chain 50. Pulling on the pull-chain 50 causes the ratchet plate 42 to rotate. The rotating ratchet plate 42 keys on the clutch plate 40 causing the clutch plate 40 to rotate. As the clutch plate 40 is connected to the ball valve 30, rotation of the clutch plate 40 causes the ball valve 30 to rotate. The pull-chain assembly 14 is set to allow the ball valve 30 to rotate exactly 90 degrees with each pull of the pull-chain 50, through appropriate means such as an over-center spring system (not illustrated) that allows the ball valve 30 to be able to rotate only in 90 degree increments and if the pull-chain 50 is not pulled sufficiently, return the ball valve 30 to its initial position prior to pull-chain 50 pulling. When the pull chain 50 is fully pulled (or partially pulled) and released, the spring 54 returns the pull-chain 50 back to its normal ready position. The spring 54 has a sufficient spring constant so as to overcome the ratchet pawl 46 acting on the ratchet plate 42. Once the person desires the water stream to continue, the pull-chain 50 is pulled again in order to rotate the ball valve 30 back to its open position. The ball valve 30 travels in a continuous loop, advancing 90 degrees with each pull of the pull-chain 50 and thereby cycling the ball valve 30 on and off with each sufficient pull-chain 50 pull.

While the invention has been particularly shown and described with reference to an embodiment thereof, it will be appreciated by those skilled in the art that various changes in form and detail may be made without departing from the spirit and scope of the invention.

I claim:

1. A valve assembly for controlling a flow of water therethrough comprising:
   a housing having an inlet wherein the water enters the housing and an outlet wherein the water exits the housing;
   a valve disposed within the housing, the valve capable of articulating between an open position wherein fluid flow communication between the inlet and the outlet is allowed and a closed position wherein fluid flow communication between the inlet and the outlet is denied, the valve rotatably connected to the housing via a pin passing through the valve, wherein said valve is a ball valve; and
   a pull-chain assembly attached to the housing, the pull-chain assembly controlling the articulation of the valve between the open position and the closed position, the pull-chain assembly comprising a clutch plate rotatably disposed about the pin within the pull-chain assembly and attached to the valve, a ratchet plate rotatably disposed within the pull-chain assembly and keyed to the clutch plate so that clockwise rotation of the ratchet plate rotates the clutch plate and counterrotation of the ratchet plate does not rotate the clutch plate such that a series of evenly spaced teeth are disposed about the entire outer periphery of the ratchet plate such that a gap is located between each pair of adjacent teeth such that a ratchet pawl is biased into the gap between an adjacent pair of the teeth in order to prevent free wheeling of the ratchet plate, said pin passing through both said clutch plate and said ratchet plate, a spring disposed between an outer plate and said ratchet pawl in order to bias said ratchet pawl against said ratchet plate, and a pull-chain attached to the ratchet plate for rotating the ratchet plate, wherein said ball valve, said clutch plate and said ratchet plate together rotate in a direction that is perpendicular to a longitudinal axis of said pin.

2. The valve assembly as in claim 1 wherein the inlet has female threading therein.

3. The valve assembly as in claim 1 wherein the outlet has male threading thereon.

4. The valve assembly as in claim 1 wherein the outlet has male threading thereon.

5. The valve assembly as in claim 1 further comprising a shower head threadably attached to the outlet.

6. The valve assembly as in claim 1 further comprising a leaf spring attached to the pull-chain assembly and to the pull-chain for subsequent retraction the pull-chain upon advancement of the pull-chain.

* * * * *